United States Patent [19]
Comer et al.

[11] Patent Number: 6,139,930
[45] Date of Patent: Oct. 31, 2000

[54] FILMS

[76] Inventors: Annette Marie Comer, Rte. 2, Box 374A, Green Violet Dr., Covington, Va. 22426; Michael Gary Fatica, 20 Pine Way, Chestnut Valley, Newark, Del. 19711; Francis John Kolpak, 33 Skycrest Dr., Landenberg, Pa. 19350; Leo Michael Landoll, 1 Ice Pond Trail, Hockessin Hunt, Hockessin, Del. 19707

[21] Appl. No.: 08/590,151

[22] Filed: Jan. 23, 1996

Related U.S. Application Data

[63] Continuation-in-part of application No. 08/489,248, Jun. 13, 1995, abandoned, which is a continuation of application No. 08/076,894, Jun. 15, 1993, abandoned.

[51] Int. Cl.$^7$ .............................. B29D 22/00; B32B 1/08
[52] U.S. Cl. ..................... 428/36.5; 428/36.6; 428/36.7; 428/141; 428/332; 428/511; 428/516
[58] Field of Search ................... 428/36.5, 141, 428/511, 367, 516, 332, 36.6

[56] References Cited

U.S. PATENT DOCUMENTS

| | | | |
|---|---|---|---|
| 2,632,921 | 3/1953 | Kreidl ..................................... | 427/316 |
| 2,648,097 | 8/1953 | Kritchever ............................... | 427/223 |
| 3,028,622 | 4/1962 | Park ........................................ | 427/223 |
| 3,255,034 | 6/1966 | Covington et al. ...................... | 427/223 |
| 3,347,697 | 10/1967 | Gmitro .................................... | 428/516 |
| 3,375,126 | 3/1968 | Nagel ...................................... | 427/224 |
| 3,666,836 | 5/1972 | John . | |
| 4,112,034 | 9/1978 | Nash et al. .............................. | 264/565 |
| 4,239,827 | 12/1980 | Notaro .................................... | 428/34.5 |
| 4,254,183 | 3/1981 | Nash et al. .............................. | 428/213 |
| 4,345,005 | 8/1982 | All ........................................... | 428/461 |
| 4,604,322 | 8/1986 | Reid ....................................... | 428/332 |
| 4,692,380 | 9/1987 | Reid ....................................... | 428/348 |
| 4,888,237 | 12/1989 | Balloni et al. ........................... | 428/347 |
| 4,921,749 | 5/1990 | Bossaert et al. ........................ | 428/216 |
| 4,975,315 | 12/1990 | Bothe et al. ............................ | 428/216 |
| 5,277,970 | 1/1994 | Schuhmann et al. ................... | 428/323 |
| 5,302,427 | 4/1994 | Murschall et al. ...................... | 428/34.2 |
| 5,326,625 | 7/1994 | Schuhmann et al. ................... | 428/215 |
| 5,436,041 | 7/1995 | Murschall et al. ...................... | 428/34.2 |

FOREIGN PATENT DOCUMENTS

| | | |
|---|---|---|
| 0288227 | 10/1986 | European Pat. Off. . |
| 58-213037 | 12/1983 | Japan . |
| 60-210647 | 10/1985 | Japan . |
| 61-225049 | 10/1986 | Japan . |

OTHER PUBLICATIONS

Hecules Incorporated Technical Information Bulletin FC–33B.
Hercules Incorporated Technical Information Bulletin FC–47A.
Hercules Incorporated Development Data Sheet Her. 27476.
Bennett et al., *Introduction to Surface Roughness and Scattering*, 1989, Optical Society of America, Chapter 4, "Scattering Theories and Surface Statistics", pp. 38–39.
Hercules Technical Information Sheet Bulletin FC–31F (Supresedes FC–31E), HER. 27477 for Hercules WT503/2B Composite, Opaque White Oriented Polypropylene (OPP) Film.

*Primary Examiner*—Leszek Kiliman
*Attorney, Agent, or Firm*—Caesar, Rivise, Berbstein, Cohen & Pokotilow, Ltd.

[57] ABSTRACT

A film having one or more polyolefin layers, and a barrier coating. At least one polyolefin layer has a surface for receiving barrier coatings, and which includes a polyolefin and a hydrocarbon resin; the barrier coating is situated adjacent to this surface. The film has a WVTR, measured according to ASTM F1249-90, of less than about 0.47 gm/m$^2$/day.

28 Claims, 5 Drawing Sheets

FILMS

This invention is a continuation-in-part of application Ser. No. 08/489,248 filed Jun. 13 1995 now abandoned, which was a continuation of application Ser. No. 08/076,894 filed Jun. 15, 1993 and now abandoned.

FIELD OF THE INVENTION

The present invention relates to films, including polymeric films. The present invention particularly relates to films with one or more polymer layers and to their preparation.

DESCRIPTION OF BACKGROUND AND OTHER INFORMATION

Various materials are known for use in the packaging industry. The various properties sought in such materials include attractive appearance and enhanced barrier to ultraviolet and visible light, as well as to moisture, oxygen and aroma.

Among such materials are the metallized films. Suitable polymers for these films include the polyolefins such as polypropylene. Commercially available metallizable films are described in Hercules Incorporated Technical Information Bulletins FC-33B and FC-47A. These products consist of an Opaque homopolypropylene core provided with a metal coating receiving layer to which has been added a hydrocarbon resin as a processing aid as well as other additives including slip agents and antiblock agents. The polypropylene core is opacified by inclusion therein of a particulate material that leads to the formation of internal voids in the polymer matrix when the film is drawn. These films, for reasons that have not been fully explained, exhibit very poor metal adhesion and are accordingly useful for only relatively low performance applications such as candy wrappers and insulation facing.

The inclusion of different additives, blended with the polyolefins, is also known. For instance, TORAY INDUSTRIES, INC. (Japanese Patent Publication No. 61-225049) discloses various films of polypropylene blended with petroleum and/or terpene resins and metallized with aluminum.

Particularly, the invention to which this reference is directed involves corona treatment of polypropylene film surfaces under nitrogen and carbon dioxide atmospheres. This treatment introduces imino and/or amino nitrogen groups into the surface to a depth of 100 Angstroms. It is the thusly treated film surface which is metallized.

TORAY INDUSTRIES, INC. also discloses comparative examples. One of these, Comparative Example 3, discloses corona treatment of a polypropylene surface in the presence of air with the previously discussed introduction of nitrogen accordingly not taking place. Metal is thereafter deposited on this surface. The resulting film is indicated to have a Moisture Permeability Rate, measured at g/m$^2$/day/15 μm, of 2.1.

It has been discovered that transparent films with at least one polyolefin layer and, further, having a barrier coating receiving surface can be provided wherein such surface is characterized by a topography—specifically, a consistent roughness—not previously known or suggested in the art for such films. It has also been discovered that such films, of the indicated topography, possess a degree of moisture and oxygen barrier also not known or suggested in the art. Moreover, they exhibit both excellent resistance to metal cracking and superior metal adhesion.

Yet additionally, it has been discovered that polyolefin films, likewise with the indicated one or more polyolefin layers wherein the barrier coating receiving surface is provided by a polyolefin layer and wherein this layer includes a hydrocarbon resin can be provided with the indicated advantageous properties.

It has also been discovered, as to such polyolefin films, that the barrier coating receiving surface provided by the indicated polyolefin layer can likewise be characterized by an increased resistance to damage from contact with other surfaces.

Still further, it has been discovered that composite, or multilayer polymer films, including both a core layer and a polyolefin barrier coating receiving layer, can be provided, with the barrier coating receiving layer including a hydrocarbon resin. Consistent with the foregoing, such films similarly exhibit excellent barrier properties, resistance to crazing and metal cracking and superior metal adhesion.

SUMMARY OF THE INVENTION

The invention pertains to a film, such as a polymeric film, comprising at least one polyolefin layer and a barrier coating receiving surface. Further, the film of the invention can comprise at least one additional polyolefin layer. The indicated barrier coating receiving surface can be oxidatively treated.

Further, the barrier coating receiving surface can have an average RMS roughness of at least about 12 nm., with a standard deviation of less than about 2. The average RMS roughness is preferably at least about 14 nm., with a standard deviation of less than about 1.2 and, more preferably, at least about 14.2 nm., with a standard deviation of less than about 1.

The film of the invention can include a barrier coating adjacent the barrier coating receiving surface. Preferably, the barrier coating comprises at least one member selected from the group consisting of metals, silicon oxides, aluminum oxides and mixtures thereof. A particularly preferred barrier coating is aluminum.

Where a barrier coating is included, the film preferably has a WVTR, measured according to ASTM F1249-90, of less than about 0.47 gm/m$^2$/day. The WVTR is, more preferably, less than about 0.26 gm/m$^2$/day and, still more preferably, less than about 0.17 gm/m$^2$/day.

Also, where a barrier coating is included, the film preferably has an OTR, measured according to ASTM D3985-81, of less than about 155 cm$^3$/m$^2$/atm/day. More preferably, the OTR is less than about 77.5 cm$^3$/m$^2$/atm/day and, more preferably, less than about 31 cm$^3$/m$^2$/atm/day. In a particularly preferred embodiment, the OTR is less than about 15.5 cm$^3$/m$^2$/atm/day.

Further as to the barrier coating receiving surface, this surface can comprise a polyolefin and a hydrocarbon resin. Preferably, the hydrocarbon resin comprises at least one member selected from the group consisting of resins prepared from terpene monomers, resins prepared from hydrocarbon monomers, resins prepared from monomers derived from $C_9$ petroleum fractions and dicyclopentadiene resins. As a matter of particular preference, the hydrocarbon resin comprises a hydrogenated hydrocarbon resin.

The at least one polyolefin layer of the film of the invention can comprise a barrier coating receiving layer, comprising the barrier coating receiving surface. This layer can be formed from a polyolefin starting material having a hardness, measured according to ASTM D785-89, of at least about R95. This hardness is, more preferably, at least about R97 or, still more preferably, at least about R100. As a matter of particular preference, this hardness is at least about R110.

Preferably, the indicated polyolefin starting material comprises a polyolefin and a hydrocarbon resin. As a general matter, the barrier coating receiving layer of the film of the invention preferably comprises about 1 to about 30% by weight of hydrocarbon resin.

This layer more preferably comprises about 3 to about 22% by weight or, still more preferably, comprises about 5 to about 20% by weight of hydrocarbon resin. As a matter of particular preference, this layer comprises about 7 to about 15% by weight of hydrocarbon resin.

In the film of the invention, the at least one polyolefin layer can consist essentially of one layer. This layer can comprise the polyolefin and the hydrocarbon resin of the barrier coating receiving surface, where the barrier coating receiving surface includes hydrocarbon resin, as indicated.

Further, in the film of the invention, the at least one polyolefin layer can comprise a base layer and a barrier coating layer. In this instance, the base layer comprises a polyolefin and further comprises a first surface and a second surface, with the barrier coating receiving layer being situated adjacent the indicated first surface. The barrier coating receiving layer, comprising the barrier coating receiving surface, can further comprise the polyolefin and the hydrocarbon resin of the barrier coating receiving surface; here also, where the barrier coating receiving surface thusly includes hydrocarbon resin.

Yet further, where the film of the invention comprises a base layer and a barrier coating receiving layer, as indicated, there may also be included an additional polyolefin layer adjacent the second surface of the base layer. Preferably, this additional polyolefin layer comprises a member selected from the group consisting of sealable layers, printable layers and slip layers.

The invention also pertains to a film, such as a polymeric film, comprising a base layer provided with a first surface and a second surface and a barrier coating receiving layer adjacent the first surface of the base layer, and providing a barrier coating receiving surface. The barrier coating receiving layer comprises a polyolefin—preferably, a polypropylene.

The base layer preferably comprises a polymer, and, more preferably, a polyolefin. As a matter of particular preference, the base layer comprises a polypropylene. Particularly, the base layer and the barrier coating receiving layer may comprise the same polypropylene.

Moreover, the barrier coating layer also comprises at least one hydrocarbon resin. Preferably, this is a hydrogenated hydrocarbon resin. The hydrocarbon resin may be present in or absent from, or at least essentially, or substantially absent from, the base layer.

Polypropylene is the preferred polyolefin for the film of the invention. Specifically, polypropylene is the preferred polyolefin for the one or more polyolefin layers in the film of the invention. For instance, where the film includes both a base layer and a barrier coating receiving layer, both layers, as a matter of preference, comprise polypropylene.

DESCRIPTION OF THE INVENTION

Figure 1:
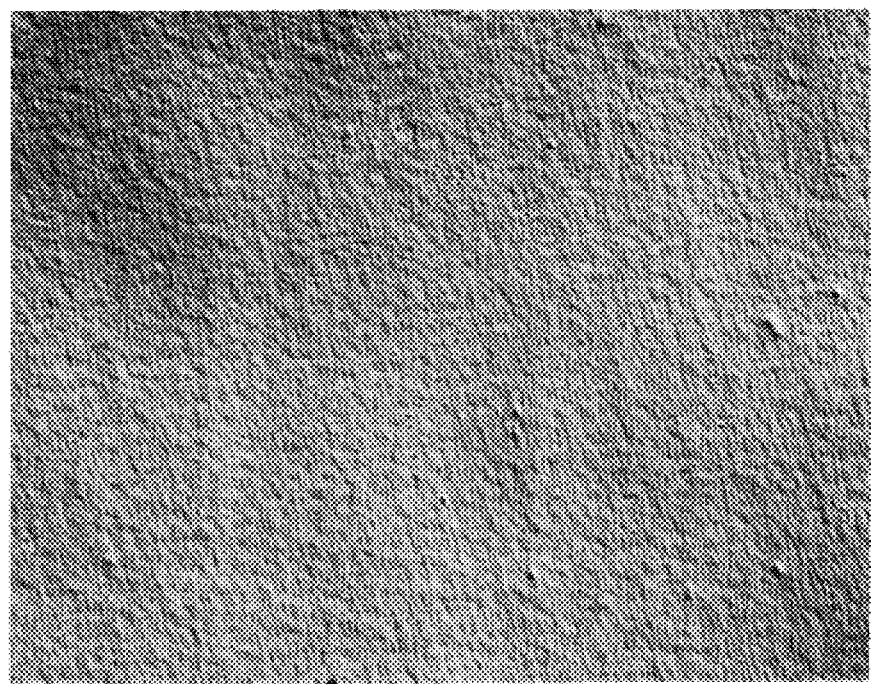
FIGS. 1–5 are photomicrographs of the barrier coating receiving surfaces of films of the invention at 100× magnification.

The Root Mean Square (RMS) roughness parameter and the Average Roughness ($R_a$) parameter are recognized in the art and are used herein in accordance with their commonly understood meanings. Specifically, these parameters are employed as they are defined in BENNETT et al., *Introduction to Surface Roughness and Scattering,* 1989, Optical Society of America, particularly in Chapter 4, "Scattering Theories and Surface Statistics". BENNETT et al. is incorporated herein, in its entirety, by reference thereto.

Average RMS roughness and average $R_a$ are also terms recognized in the art and the use herein of these terms is likewise in accordance with their commonly understood meanings. However, in the determination of these average values, variations in measurement techniques may cause different results to be obtained. Accordingly, for the purposes herein, the average RMS roughness and the average $R_a$ are understood as having been obtained with use of the following instrumentation and according to the following techniques.

Specifically, the topography of a surface for which average RMS roughness and the average $R_a$ are determined is measured with a non-contact interferometer and preferably a TOPO3D Interferometer, from WYKO Corporation, Tucson, Ariz. At least 10 and, most preferably 10, measurements are taken across the surface at different locations. The spacial sample interval is 0.4 micron and the profile area is 51 microns by 51 microns. 10× magnification is employed.

With regard to the problem of variances resulting from differences in instrumentation and techniques, it is noted that non-contact measurement is preferred as compared to use of a contact (stylus) measurement instrument. Further, measurements taken at less than 10× magnification can be adversely affected by surface distortion (i.e., waviness).

The water vapor transmission rate (WVTR), as discussed herein, is measured according to ASTM F1249-90, which is incorporated herein in its entirety, by reference thereto. The Oxygen Transmission Rate (OTR) is measured according to ASTM D3985-81, which is also incorporated herein in its entirety, by reference thereto.

Hardness, particularly of polyolefin starting material, is measured according to ASTM D785-89, which is also incorporated herein in its entirety, by reference thereto. In this context, the polyolefin starting material refers to what is used to prepare a film layer. The polyolefin starting material can be polyolefin alone or can include other components, such as hydrocarbon resin.

Polymers suitable for the films of the invention include the polyolefins. Polyolefins which may be employed are the polyethylenes, polypropylenes, poly 1-butenes, poly 2-butenes, polyisobutylenes, and polystyrenes. Suitable polyolefins include those as disclosed in BOSSAERT et al. (U.S. Pat. No. 4,921,749), REID '322 (U.S. Pat. No. 4,604, 322) and REID '380 (U.S. Pat. No. 4,692,380), which patents are hereby incorporated herein in their entireties, by reference thereto.

The polypropylenes are preferred. Particularly preferred are the polypropylene homopolymers, although copolymers of polypropylene with minor amounts of ethylene or an alpha-olefin, are also suitable.

Among the suitable polypropylenes are commercially available film-forming polypropylene homopolymers which are crystalline or isotactic in their molecular structure and have a melt flow rate of about 2 to 10 dg/min. One polypropylene which can be used is a highly isotactic polypropylene, having a melting point of about 160° C. and a melt flow rate of 3.50, from Aristech Chemical Corporation, Pittsburgh, Pa.

Resins of the invention include the hydrocarbon resins, particularly those hydrocarbon resins which are compatible with the noncrystalline regions of the polyolefin of the layers in which such resins are provided. In being thusly compatible, such resins will interdisperse into the indicated polyolefin regions.

Suitable hydrocarbon resins include the hydrogenated and nonhydrogenated resins, thusly characterized by the indicated property of compatibility. For hydrocarbon resins which are compatible with their polyolefins, whether or not hydrogenated, such resins may be hydrogenated or nonhydrogenated. Where particular resins are, in their nonhydrogenated state, incompatible with the polyolefin, but are compatible when hydrogenated, these resins may be used in their hydrogenated form.

Further as to suitable hydrocarbon resins, these include those derived from olefin monomers, such as the resins derived from terpene monomers, coal tar fractions and petroleum feedstocks. Particularly, the suitable resins include those prepared from terpene monomers (e.g., limonene, alpha and beta pinene, such as Piccolyte resins from Hercules Incorporated, Wilmington, Del., and Zonatac resins from Arizona Chemical Company, Panama City, Fla.), and from hydrocarbon monomers and mixtures thereof, such as $C_5$ monomers (e.g., piperylene, cyclopentene, cyclopentadiene, and isoprene), oligomerized $C_5$ monomers, particularly the thermally oligomerized $C_5$ monomers and the $C_9$ monomers, particularly the monomers derived from $C_9$ petroleum fractions which are mixtures of the aromatics, including styrene, methyl styrene, alpha methyl styrene, vinyl naphthalene, the indenes and methyl indenes and, additionally, pure aromatic monomers, including styrene, $\alpha$-methyl-styrene--vinyltoluenes, and mixtures thereof. The hydrogenated $C_9$ and pure monomer resins are preferred. Particularly preferred are the hydrogenated aromatic resins derived from pure aromatic monomers, e.g., the hydrogenated $\alpha$-methyl-styrene--vinyltoluene copolymers and the hydrogenated cyclopentadiene resins.

Suitable hydrocarbon resins, including hydrogenated hydrocarbon resins, for the invention are disclosed in BOSSAERT et al., as well as in European Patent Application No. 0 288 277 and in Japanese Patent Publication No. 58-213037. These European and Japanese patent publications are also hereby incorporated herein in their entireties, by reference thereto. Commercially available hydrocarbon resins which may be used include Hercules Regalrez 1128 and 1139, hydrogenated $\alpha$-methyl-styrene--vinyltoluene resin copolymers, Hercules Piccolyte C125, a terpene resin, as well as Escorez 5300, a hydrogenated thermally oligomerized cyclopentadiene resin available from Exxon Chemical Company, Baytown, Tex.

The films of the invention include monolayer structures and composite, or multilayer, structures. Particularly, the films of the invention can be provided with a single polyolefin layer including the hydrocarbon resin dispersed therethrough. In such instance, this single layer serves as the bonding, or barrier coating receiving, layer and provides the barrier coating receiving surface.

As a preferred embodiment, the films of the invention comprise a composite, or multilayer, polyolefin structure having a core layer and one or two barrier coating receiving layers. The same or different polyolefins can be employed for these multiple layers. Thus, the core, or base, layer can be polypropylene or a copolymer of propylene with another olefin in an amount that does not negatively impact the properties that make polypropylene desirable for the core layer.

Unless the context indicates otherwise, reference herein to polypropylene is intended to indicate either an isotactic homopolymer of propylene or a copolymer of propylene with an $\alpha$-olefin, said $\alpha$-olefin being present in an amount that does not negatively impact the properties that make polypropylene desirable foe the core layer.

The barrier coating layer or layers are preferably polypropylene. Such layer(s) can also be a polypropylene matrix containing up to about 50% by weight of a copolymer of ethylene with propylene wherein the copolymer contains up to about 7% ethylene.

The barrier coating receiving layer includes a sufficient portion of the hydrocarbon resin, so as to provide the requisite amount of such resin in its surface opposite the surface adjacent the core layer, for this opposite surface to serve as a barrier coating receiving surface.

In the polyolefin layer providing the barrier coating receiving surface, the hydrocarbon resin is preferably present in an amount of at least about 1% by weight of the layer. A preferred range is from about 1 to 30% by weight of the layer.

More preferably, the hydrocarbon resin is preferably present in an amount of at least about 3% percent by weight of the layer. A more preferred range is from about 3% to about 22% by weight of the layer.

The hydrocarbon resin can be present in an amount of at least about 11% by weight of the layer. As another preferred range, the hydrocarbon resin is present in an amount of from about 11 to 22% by weight of the layer.

Alternatively, the hydrocarbon resin can be present in an amount of at least about 5% percent by weight of the layer. As yet another preferred range, the hydrocarbon resin is present in an amount of from about 5 to 20% by weight of the layer.

As a matter of particular preference, the hydrocarbon resin can be present in an amount of at least about 7% by weight of the layer. As a particularly preferred range, the hydrocarbon resin is present in an amount of from 7 to 15% by weight of the layer.

Commercially available blends of polyolefin and hydrocarbon resin may be employed for a resin-bearing layer— particularly, a barrier coating receiving layer of the films of the invention. For instance, Exxon HP3, which is a blend of a polypropylene homopolymer with a thermally polymerized hydrogenated cyclopentadiene resin, from Exxon Chemical Company, Baytown, Tex., can be used for the single polyolefin layer in the single layer embodiment or as the barrier coating receiving layer in the multiple polyolefin layer embodiment.

Whether the single polyolefin layer structure or a multiple polyolefin layer configuration is employed, a further layer can likewise be utilized. Particularly with respect to the composite, or multilayer, polyolefin embodiment, this additional layer will, like the barrier coating receiving layer, be situated adjacent the core layer, but on the side opposite the barrier coating receiving layer.

When a third layer is present that is not intended to serve as a barrier coating receiving layer, the choice of polymer to be used in that layer is dictated to some extent by the function that layer is to serve.

This additional layer can be, for example, a conventional sealable; e.g., heat sealable, printable or slip layer. Further, it can be a layer suitable for lamination with a yet additional layer or other material, for instance, according to any of the procedures known in the art.

Thus, if the third layer is to serve as a heat seal layer, a polymer or copolymer of a lower melting point than that of polypropylene is used. Suitable heat sealable layers include polyvinylidene chlorides (PVDC's), low density polyethylene, ethylene--α-olefin copolymers such as ethylene--butene-1 and ethylene--octene polymers, and ethylene--propylene--butene-1 terpolymers.

If the third layer is to be a slip layer, the third layer can be selected from the same polymers that can be used in the core layer or those used in the other functional layers. Polyolefin mixtures are also suitable. Preferably, this layer utilizes a polypropylene, most preferably a propylene homopolymer.

Conventional additives, in conventional amounts, can be employed in the polypropylene core layer. Suitable such additives include antioxidants, pigments, orientation stress modifiers, flame retardants, antistat agents and antifog agents. Suitable additives also include stabilizers, such as light stabilizers and radiation stabilizers. Antacids may also be used. Suitable inorganic antacids include calcium oxide and magnesium aluminum hydroxide carbonate hydrate.

With respect to pigments, it is preferred that the core layer be transparent. If a pigment is included, it should be one that does not result in voiding of the polymer to produce opacity.

Further additives which can be used are slip agents, including migratory and/or nonmigratory slip agents. These are preferably present in a layer in amounts of about 0.03 to 0.15 pph. Commercially available slip agents which can be used include Kemamide, from Humko Chemical Division, Memphis, Tenn. Also appropriate additives are antiblocking agents, including synthetic and natural antiblocking agents, such as synthetic amorphous silica, one source of which is W. R. Grace & Co., Baltimore, Md., and Nikoloid, an irregular zeolitic antiblocking agent from Sumitomo Chemical America, Inc., New York, N.Y., as well as Tospearl, a uniformly sized, crosslinked silicone rubber antiblocking agent, from Toshiba Silicone Ltd., Japan.

With respect to the barrier coating receiving layer, only those additives that do not adversely affect adhesion of the barrier coating or the barrier properties of the film can be employed. Thus, additives such as slip agents and antiblock agents should not be included. To the extent that these may be required, sufficient amounts will normally migrate from the core layer to the barrier coating receiving layer. As to other additives, the practitioner can readily determine whether a specific additive will adversely affect the desirable properties of the film.

Particularly as to the multiple polyolefin layer embodiment, the core layer, besides the presence or absence of other additives, can include hydrocarbon resin or such resin can be absent or at least substantially, or essentially, absent from this layer. The hydrocarbon resin can be present in this layer in such a proportion as is included in the barrier coating receiving layer. Alternatively, the resin can be provided in lower, additive amounts, as are sufficient for sufficiently improving machinability and clarity and adding stiffness to the product, e.g., about 0.1 to 3% by weight of the layer.

The total polyolefin layer thickness, for both the single and multiple polyolefin layer embodiments, is preferably in the range of about 0.25 mil to about 1.00 mil. Particularly as to the multiple polyolefin layer embodiment, the core layer preferably has a thickness of about 0.23 mil to about 0.80 nil, while the barrier coating receiving layer preferably has a thickness of about 0.01 mil to about 0.10 mil. For both the single and multiple polyolefin layer embodiments, where the previously discussed additional layer —e.g., a sealable, printable, or slip layer—is also present, this layer preferably has a thickness of about 0.01 mil to about 0.10 mil, added to the thickness of the indicated single or multiple polyolefin layer structure. Based on the above thicknesses, it will be understood that the barrier coating receiving layer has a thickness about 1.25 to 43.5% that of the core layer.

Methods suitable for use in preparing the films of the invention include extrusion coating, lamination, cast extrusion and coextrusion. The methods as disclosed in BOSSAERT et al., REID '322, REID '380 and European Patent Application No. 0 288 227 may be employed. Coextrusion—specifically, simultaneous coextrusion—is preferred.

The films of the invention can be laminated with other films, according to known procedures.

Further, the films of the invention may be unoriented or unilaterally oriented, but are preferably biaxially oriented by drawing in two mutually perpendicular directions in the plane of the film, to impart strength thereto. Blown tube (i.e., "bubble") and tenter techniques, known in the art, may be used to obtain biaxial orientation. Particularly, bubble and tenter techniques as disclosed in BOSSAERT et al. REID '322, REID '380, and European Patent Application No. 0 288 227 may be employed.

For both the single polyolefin layer and multiple polyolefin layers embodiments, one or both, sides of the film can be subjected to oxidative treatment. The treatment employed can be a minimal oxidative treatment. Particularly, the oxidative treatment is preferably applied to the barrier coating receiving surface, prior to application of the barrier coating, to activate this surface, i.e., to facilitate good adhesion of the barrier coating to this surface. Accordingly, the degree of such oxidative treatment employed is preferably that which is sufficient to accomplish the indicated goal—specifically, of attaining a surface which provides the requisite adhesion.

Suitable oxidative treatments include, for example, plasma treatment, corona treatment, flame treatment and etching with acid, according to known processes. Particularly, both corona and flame treatment, in succession—also, according to known processes—can be employed.

Corona treatments which may be employed include those utilizing corona discharge to about 35 to 60 dynes/cm or, more preferably, about 38 to 53 dynes/cm or 35 to 40 dynes/cm. Illustrative flame treatment techniques which can be employed are those as disclosed in U.S. Pat. Nos. 2,632,921, 2,648,097, 3,028,622, 3,255,034, 3,347,697, 3,375,126, and 4,239,827. These patents are incorporated herein in their entireties, by reference thereto.

A barrier coating may be applied to the thusly treated barrier coating receiving surface. Suitable means for applying the barrier coating include sputtering, vacuum deposition, treatment and electroplating.

Preferably, the barrier coating is a metal or a mixture of metals, the application of which results in a metallized film. Particular appropriate barrier coatings include silicon oxides, silicon oxide/aluminum mixtures, aluminum, aluminum oxides, zinc, copper (and alloys thereof, such as bronze), gold, silver, copper and mixtures of the foregoing. Of these, aluminum coatings are preferred.

Preferably, the barrier coating is applied to a thickness of about 75 to 500 Angstroms. A more preferred range is 100 to 350 Angstroms, with a range of about 120 to 175 Angstroms being particularly preferred.

A significant aspect of the films of the invention is the topography which characterizes their barrier coating receiving surfaces. In this regard, what are particularly of interest are the texture—particularly, the roughness—of the surface and the degree of uniformity, or consistency, of this roughness.

Herein, roughness is measured in terms of average RMS roughness and average $R_a$ while consistency is provided as standard deviation, for both average RMS and average $R_a$. All of these roughness and consistency values are determined, for the surfaces measured, at 100× magnification.

For the films of the invention, the average RMS roughness is preferably at least about 12 nm. A preferred range is between about 12 and 16 nm.

More preferably, the average RMS roughness is at least about 14 nm. A more preferred range is between about 14 and 15 nm.

As a matter of particular preference, the average RMS roughness is at least about 14.2 nm. A particularly preferred range is about 14.2 to 14.8 nm.

The average $R_a$ is preferably at least about 9 nm. A preferred range is between about 9 and 13 nm.

More preferably, the average $R_a$ is at least about 10 nm. A more preferred range is between about 10 and 12.5 nm.

As a matter of particular preference, the average $R_a$ at least about 11 nm. A particularly preferred range is about 11 to 12 nm.

Correspondingly, for the average RMS roughness as well as the average $R_a$ values, the standard deviation is preferably less than about 2. A preferred standard deviation range—again, for both the average RMS roughness and average $R_a$ values—is between about 0.2 and 2.

More preferably, the standard deviation is less than about 1.2. In this regard, a more preferred range is between about 0.2 and 1.2.

As a matter of particular preference, the standard deviation is less than about 1. A particularly preferred range is from about 0.2 to 1.

Still more preferably, the standard deviation is less than about 0.886 or less than about 0.795 or less than about 0.756 or less than about 0.705 or less than 0.690. Another preferred range is about 0.2 to 0.886 or less than about 0.2 to 0.756.

Unaided visual inspection of the barrier coating receiving surfaces of the films of the invention suggests that they are smooth. The indicated magnification reveals that, in fact, the surfaces do indeed exhibit a degree of roughness, as evidenced by their average RMS roughness and average $R_a$ values.

However, such roughness is further characterized by the indicated high degree of uniformity, or consistency, as demonstrated by the relatively low standard deviation in the average RMS roughness and average $R_a$ values, as set forth above. This combination of roughness and consistency, or "consistent roughness", of the barrier coating receiving surface is an important feature of the films of the invention.

Specifically, such consistent roughness provides the films with excellent surfaces for receiving barrier coatings. When the barrier coatings are added, this topography contributes to excellent oxygen and moisture barrier values.

Another significant aspect of the films of the invention is the resistance of their barrier coating receiving surfaces to damage—particularly, from the opposing film surface. This is another property which, with the addition of the barrier coating, impacts favorably upon oxygen and moisture barrier values.

In this regard, tension, heat and abrasion can all affect the barrier coating receiving surface of the film, prior to addition of the barrier coating. Particularly, commercial production of the film commonly involves winding. Variability in the wind, as indicated by differing hardness of rolls, can potentially damage the barrier coating receiving surface.

Contact of the film's barrier coating receiving surface with other surfaces, such as during the winding operation, can cause damage. An especial problem is contact with the opposing side of the film, e.g., with a further layer, such as a printable, sealable, laminable or slip layer, provided on the other film side, as previously discussed.

It has been discovered that increased resistance to damage of the barrier coating receiving surface results where harder polyolefin starting materials are employed for the barrier coating receiving layer of the invention. Correspondingly, this property of resistance to damage can be measured by the hardness of the polyolefin starting material from which the barrier coating receiving layer is prepared.

Typical polyolefin hardness values are R10 to R15 for polyethylene, R50 to R90 for ethylene--propylene copolymers including more than 90 percent by weight propylene, and R80 to R96 for common isotactic polypropylene. It has further been discovered that where the indicated polyolefin starting material—i.e., from which the barrier coating receiving layer is prepared—includes a hydrocarbon resin, the hardness of the material is increased by the presence of the resin.

For instance, for polypropylene with an above average hardness of R95, addition of the hydrocarbon resin results in still greater hardness. Where the blend includes 5% by weight of the resin, hardness is increased to R97. At 10%, the hardness is typically greater than R100, while at 25%, hardness is R110.

In the films of the invention, the polyolefin starting material, from which the barrier coating receiving layer is prepared, preferably has a hardness of at least about R95. More preferably, the hardness of the polyolefin starting material is at least about R97.

In a particularly preferred embodiment, the hardness of the polyolefin starting material is at least about R100. In another particularly preferred embodiment, the hardness of the polyolefin starting material is at least about R110.

Preferably, in the films of the invention, this polyolefin starting material, for the barrier coating receiving layer, includes a hydrocarbon resin. Where the polyolefin starting material consists of, or consists essentially or substantially of, the polyolefin itself, or otherwise lacks, or at least essentially or substantially lacks, hydrocarbon resin, use of such polyolefin starting material for the barrier coating receiving layer is within the scope of the invention if such polyolefin starting material meets the requisite standard for hardness, as indicated.

Regarding moisture barrier values of the films of the invention where the barrier coating is included, the films of the invention preferably have a WVTR of less than about 0.47 gm/m$^2$/day. A preferred range is from about 0.04 to 0.47 gm/m$^2$/day.

More preferably, the WVTR is less than about 0.26 g/m$^2$/day. A more preferred range is between about 0.04 and 0.26 gm/m$^2$/day.

As a matter of particular preference, the WVTR is less than about 0.17 gm/m²/day. A particularly preferred range is from about 0.04 to 0.17 gm/m²/day.

With respect to oxygen barrier values—also, where the barrier coating is included—the films of the invention preferably have an OTR of less than about 155 cm³/m²/atm/day. A preferred range is from about 1.5 to 155 cm³/m²/atm/day.

More preferably, the OTR is less than about 77.5 cm³/m²/atm/day. A more preferred range is between about 1.5 and about 77.5 cm³/²/atm/day.

Still more preferably, the OTR is less than about 31 cm³/m²/atm/day. A still more preferred range is between 1.5 about 1.5 and 31 cm³/m²/atm/day.

As a matter of particular preference, the OTR is less than about 15.5 cm³/m²/atm/day. A particularly preferred range is about 1.5 to 15.5 cm³/m²/atm/day.

A preferred lower limit for OTR is about 1.5 cm³/m²/atm/day. In this regard, however, OTR below 1.5 cm³/m²/atm/day is also within the scope of the invention.

The films of the invention are characterized by further advantages. In this regard, there are different possible factors which may induce crazing, such as film modulus and the presence of particular components.

It appears, according to the best understanding at the present, that, in the absence of components which would induce crazing, such as additives which interfere with metal adhesion, the films of the invention are craze resistant. Particularly with respect to the metallized films of the invention, these films further exhibit excellent resistance to metal cracking and superior metal adhesion.

With respect to the advantageous properties of the films of the invention, it is emphasized that the indicated superior barrier properties are not dependent on film thickness.

The films of the invention are suitable for a variety of uses, including conventional commercial applications. They have particular utility in the packaging and related arts.

The invention is illustrated by the following Examples, which are provided for the purpose of representation and are not to be construed as limiting the scope of the invention. Unless stated otherwise, all percentages, parts, etc. are by weight.

PREPARATION OF FILMS EMPLOYED IN EXAMPLES

The multilayer films of Examples 1, 2 and 10 were prepared by coextrusion, with biaxial orientation induced by the blown tube, or "bubble" process. The multilayer films of Examples 3 and 9 were prepared by the tenter process, utilizing procedures and parameters, and components and proportions, as subsequently set forth in the respective Examples.

Specifically with respect to those films prepared by the bubble process, the core layer and two surface layers—i.e., a barrier coating receiving layer and another surface layer, one on each side of the core layer—were coextruded from a trilayer extruder die head. The resulting continuously moving trilayer tubular stalk was passed initially through a cooling section and quenched therein at 15 to 30° C. to effect solidification. Then the tubular stalk was passed between a first pair of nip rolls and pinched therebetween.

After the nip rolls, the continuously moving tubular stalk was passed through a reheating section, thereby heating it to a predetermined orientation temperature of between 130 and 150° C. At this temperature, the tubular stalk was expanded with air into a very large and thin cylindrical structure, which is the "bubble", and accordingly stretched biaxially, seven times in the machine direction, and seven times in the transverse direction.

This cylindrical structure was closed at one end by having it pass through a second pair of nip rolls, and pinched therebetween, to form a double layer flat (each such layer itself comprising a trilayer structure, i.e., of the core layer, sandwiched between the two surface layers). This double layer flat was slit, thus forming two separate trilayer films.

Each trilayer film had an overall thickness of 0.55 mil, with a 0.50 mil core layer, and the barrier coating receiving layer and other surface layer being 0.02 mil and 0.03 mil thick, respectively.

The polymer of the core layer was the highly isotactic polypropylene from Aristech Chemical Corporation, as previously discussed. The composition of the barrier coating receiving layer varied, as set forth in the Examples. The other surface layer comprised the same polypropylene as that of the core layer and further contained, as an antiblocking agent, 0.08 pph of synthetic amorphous silica, from W. R. Grace & Co., Baltimore, Md.

EXAMPLE 1

Three trilayer film samples, Samples A–C, were produced according to the foregoing procedure, with each having a different barrier coating receiving layer. For Sample A, this layer was an ethylene--propylene copolymer, having a melting point of 130° C. and comprising about 3.0 percent by weight of ethylene and about 97 percent by weight propylene. Sample B utilized the same polypropylene as was in the core, while Sample C utilized Exxon HP3.

For each of Samples A–C, the trilayer film was subjected, on both sides (and accordingly, on the exposed side of each surface layer), to corona treatment. The thusly treated films were metallized by vacuum deposition of an aluminum coating on the barrier coating receiving layer. This metal coating was applied to a thickness of approximately 135 Angstroms.

The metallized film samples were tested for barrier properties. Humidity and oxygen barrier properties were determined by measuring the water vapor transmission rate (WVTR) and the oxygen transmission rate (OTR).

WVTR was measured according to ASTM F1249-90 at 37.68° C. and 0% relative humidity, using a Permetran W instrument, from Modern Controls Incorporated, Minneapolis, Minn. OTR was measured according to ASTM D3985-81 at 23° C./dry gas, using an Oxtran 100 instrument, also from Modern Controls Incorporated.

The results of this testing for barrier properties are set forth in Table 1.

TABLE 1

| SAMPLE | OTR (cm³/m²/atm/day) | WVTR (gm/m²/day |
|---|---|---|
| A | 75.2 | 0.372 |
| B | 67.3 | 0.387 |
| C | 13.2 | 0.139 |

With respect to the foregoing results, the Permatran W instrument used to obtain these values was not capable of measuring below the 0.139 (gm/m²/day) observed for Sample C. Accordingly, it is possible that the actual water vapor transmission rate could have been lower for this sample.

In any event, as can be seen from the foregoing Table, significantly greater barrier properties were obtained from Sample C, wherein the barrier coating receiving layer included a hydrogenated hydrocarbon resin than from Samples A and B. These results demonstrate the superior barrier properties provided where the barrier coating receiving layer includes a hydrocarbon resin.

EXAMPLE 2

Five more trilayer film samples, Samples D–I, were prepared according to the same procedure. As with the previous Sample C, each was provided with a barrier coating receiving layer including a hydrogenated hydrocarbon resin. For the different samples, two different hydrogenated hydrocarbon resins were employed, in varying proportions.

Specifically, Sample D was a duplication of Sample C, having Exxon HP3 as the barrier coating receiving layer. For Sample E, the barrier coating receiving surface layer was a blend of approximately 50 percent by weight each of Exxon HP3 and additional polypropylene. The presence of this amount of additional polypropylene, over and above that from the Exxon HP3 itself, accordingly provided Sample E with a barrier coating receiving layer having half the hydrocarbon resin of this layer in Sample D.

Samples F, G, and H were each provided with a barrier coating receiving layer of polypropylene blended with different proportions of Hercules Regalrez 1128. The blend of Sample F contained approximately 11% by weight of this hydrogenated hydrocarbon resin. For Sample G, the level of such resin in this layer was doubled to be approximately 22% by weight. Sample H contained approximately 3% by weight of the Regalrez resin.

Corona treatment and metallization were effected in the same manner as for Samples A–C in Example 1. Also in accordance with the procedures discussed in Example 1, testing for barrier properties was conducted. The results of these tests are set forth in Table 2.

TABLE 2

| SAMPLE | RESIN TYPE | LEVEL | OTR ($cm^3/m^2/atm/$ day) | WVTR ($gm/m^2/day$) |
| --- | --- | --- | --- | --- |
| D | Exxon HP3 | X | 12.9 | 0.139 |
| E | Exxon HP3 | X/2 | 15.3 | 0.217 |
| F | Regalrez 1128 | 11% | 17.4 | 0.201 |
| G | Regalrez 1128 | 22% | 20.1 | 0.232 |
| H | Regalrez 1128 | 3% | 18.6 | 0.248 |

The amount of the hydrocarbon resin present in the original Exxon HP3 is not itself known. Accordingly, for Sample D, the value for resin level is provided as "X". Correspondingly, because Sample E is approximately 50 percent by weight additional polypropylene, the hydrocarbon resin proportion thereof must be approximately half that of Sample D, and is therefore designated as "X/2".

Further, it is again noted, as discussed with respect to the results shown in Table 1 for water vapor transmission rate, that the device used for this value was not capable of measuring below 0.139 $gm/m^2/day$. Accordingly, the measurement obtained for Sample D could have been lower.

Notwithstanding the foregoing, the OTR and WVTR values in Table 2, like those of Sample C in Table 1, were superior to the barrier properties achieved with Samples A and B whose barrier coating receiving layers, as previously indicated, lacked a hydrocarbon resin. These values of Table 2 demonstrate that superior barrier properties are still obtained with different types and amounts of hydrocarbon resins in the barrier coating receiving layer.

EXAMPLE 3

As previously indicated, the trilayer films of Samples I–K were prepared by the tenter process. As with the films of Examples 1 and 2, coextrusion from a trilayer extruder die head was employed, to provide the corresponding configuration of a core and surface layers.

For each of the Sample I–K films, the core layer was a blend comprising a polypropylene, together with approximately 3 percent by weight Hercules Regalrez 1139, as well as 0.10 percent by weight Kemamide, as a slip agent. The other surface layer for these Samples I–K, provided as a sealable layer, was a blend of an ethylene--propylene--butene-1 terpolymer, together with 0.10 percent by weight of the Kemamide slip agent and 0.21 percent by weight Nikoloid as an antiblock agent. The terpolymer comprised approximately 2 percent by weight ethylene and approximately 14.5 percent by weight butene-1, with the propylene comprising the remainder.

Also similarly to the preparation of the films of Examples and 2, the thusly coextruded films were subjected to quenching and reheating. The quenching was conducted at 50–60° C. and the reheating, to 115–125° C.

Yet additionally like those of Examples 1 and 2, the Sample I–K films were stretched biaxially, but by the tenter process, rather than by the bubble process. Specifically, for these Example 3 films, stretching was effected in the machine direction five times, using transport rolls operating at different speeds. After the desired machine direction orientation was achieved, a film was transversely oriented ten times, at an appropriate temperature profile, in a tenter frame.

Each of the Sample I–K films had an overall thickness of 0.70 mil, with a 0.622 mil core layer, a 0.018 mil barrier coating receiving layer, and a 0.06 mil sealant layer. As to the barrier coating receiving layers, Sample I, the control, was provided with an ethylene--propylene copolymer comprising about 3% by weight ethylene and about 97% by weight propylene. For each of Sample J and Sample K, the barrier coating receiving layer was a blend of the same polypropylene employed for preparation of the Sample A–H films and approximately 11 by weight Hercules Regalrez 1128.

For the Sample I film, the barrier coating receiving layer was subjected to successive, or tandem, corona and flame treatment. The barrier coating receiving layer of the Sample J film was corona treated, while the Sample K film barrier coating receiving layer was subjected to the same tandem treatment as employed for the film of Sample I.

Metallization was effected and testing for OTR was conducted in the same manner as set forth in Examples 1 and 2. Table 3 shows the results of this testing.

TABLE 3

| SAMPLE | TREATMENT TYPE | OTR ($cm^3/m^2/atm/day$) |
| --- | --- | --- |
| H | corona and flame | 181.4 |
| I | corona | 34.1 |
| J | corona and flame | 34.1 |

Consistent with the results obtained in the previous Examples, Samples J and K, each provided with a barrier coating receiving layer having a hydrocarbon resin, exhibited significantly greater oxygen barrier than Sample I, lacking such resin in the barrier coating receiving layer. Further, a comparison of the values for Samples J and K demonstrates that the superior result was not dependent on the type of surface treatment used.

EXAMPLE 4

Laminates were prepared from Samples A–C by subjecting each Sample to an extrusion lamination. In this procedure the metallized side of each sample was bonded to a 0.75 mil Hercules T523 polypropylene slip film, utilizing 7 lbs. per ream of Chevron 1017, a linear low density polyethylene, from Chevron Chemical Company, Orange, Tex., as the extrudate.

Each thusly prepared lamination sample was tested for OTR and WVTR in accordance with the procedures discussed in the previous Examples. The corresponding average barrier values are provided in Table 4.

TABLE 4

| LAMINATED SAMPLE | OTR ($cm^3/m^2/atm/day$) | WVTR ($gm/m^2/day$) |
|---|---|---|
| A | 61.5 | 0.408 |
| B | 88.7 | 0.542 |
| C | 8.2 | 0.139 |

Yet again, as noted for Tables 1 and 2, because the device used to obtain water vapor transmission rate could not measure below the 0.139 $gm/m^2/day$ shown for Sample C, the actual result may likewise be lower for this Sample, having been thusly laminated.

Regardless, the results here, for the corresponding laminated Samples, were consistent with those obtained in Example 1. Here also, the structure having a barrier coating receiving layer with hard resin, gave significantly better OTR and WVTR values than did the laminates provided with conventional polypropylene or ethylene--propylene copolymer barrier coating receiving layers.

EXAMPLE 5

Samples L, M, N, O and P were prepared according to the procedures utilized for preparing the Samples of Examples 1 and 2. Sample N was prepared according to the procedure utilized for preparing the Samples of Example 3.

Sample L was prepared with a barrier coating receiving layer of Exxon HP3, like Samples C and D, while the barrier coating receiving layers of Samples M and N were polypropylene (like Sample B) and ethylene--propylene copolymer (like Samples A and H), respectively. For Samples O and P, the barrier coating receiving layers were blends of polypropylene with 11 percent and 22 percent by weight, respectively, of Hercules Regalrez 1128, in the manner of Samples G and H.

The topography of the barrier coating receiving surfaces of these five different Samples was measured, using two different techniques.

According to the first technique, the surfaces of Samples L–P, specifically, the barrier coating receiving surfaces provided by the respective barrier coating receiving layers were first prepped by air dusting, then sputtered with 21 nm. of gold palladium to enhance surface contrast. Micrographs of the thusly treated surfaces, at 100× magnification, were prepared, using a Model BHM-3130 Reflective Differential Interference Contrast Microscope, from Olympus, Tokyo, Japan.

These micrographs of Samples L–P are provided as FIGS. 1–5, respectively. Qualitative evaluation of the samples' barrier coating receiving surfaces was effected by inspection of these micrographs.

From a comparison of FIGS. 1–5, it is apparent that there are significant differences in the barrier coating receiving surfaces of these samples.

Figure 4:
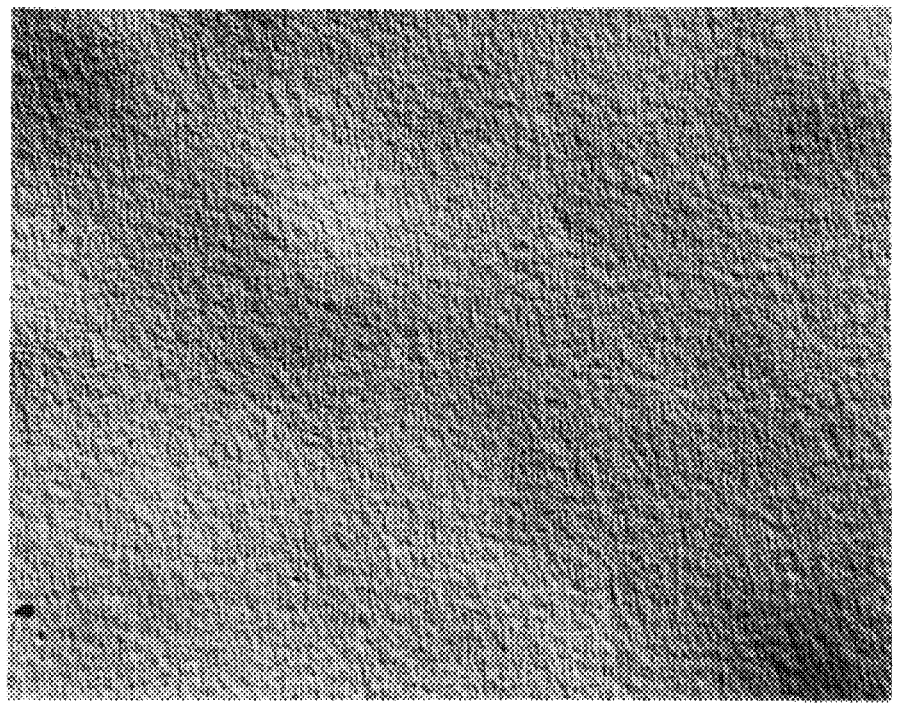
Figure 5:
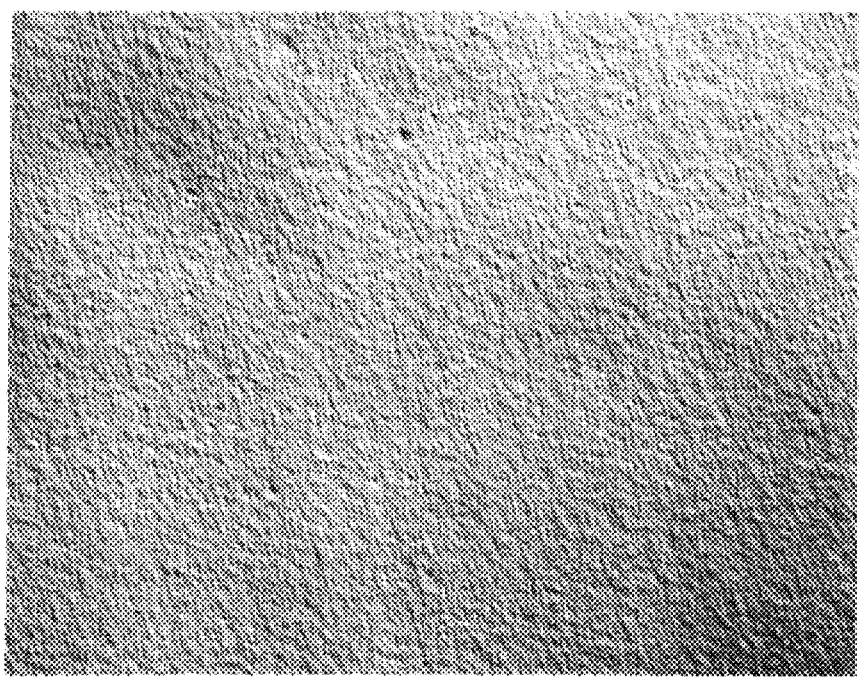
Figure 6:
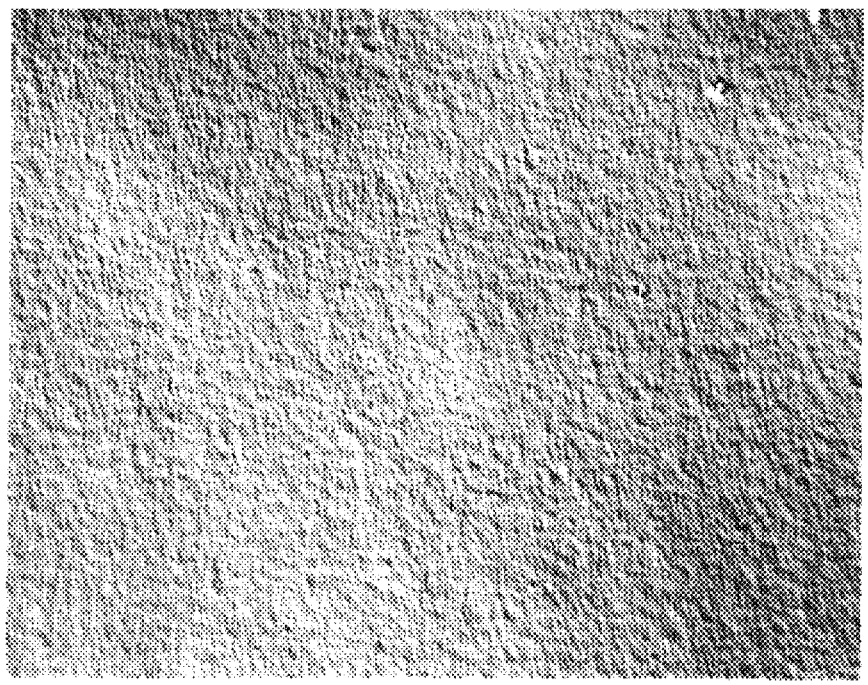
FIGS. 6–10 are photomicrographs of the barrier coating receiving surfaces of FIGS. 1–5, respectively, after metallization.
Figure 7:
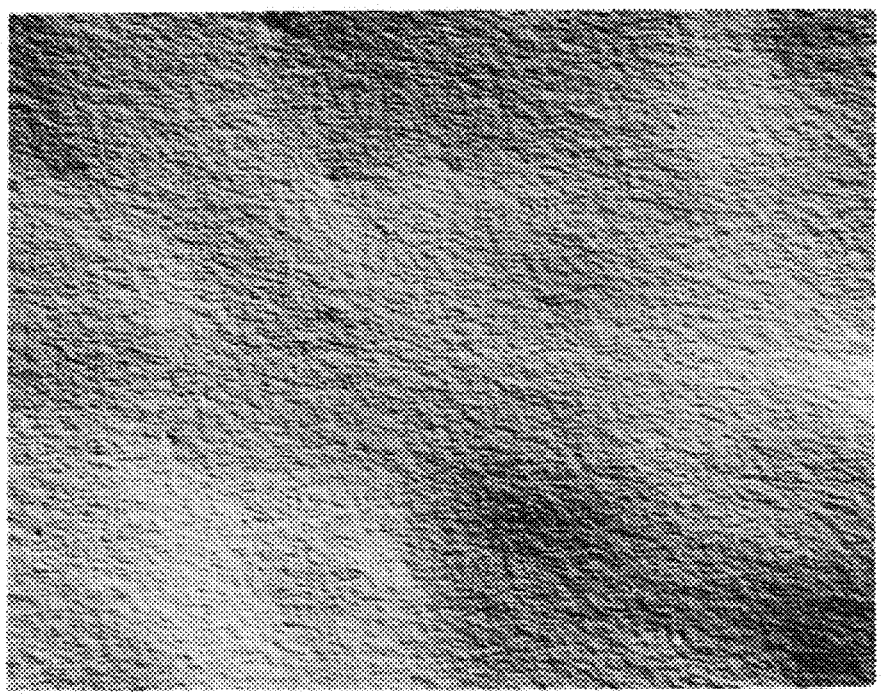
Figure 8:
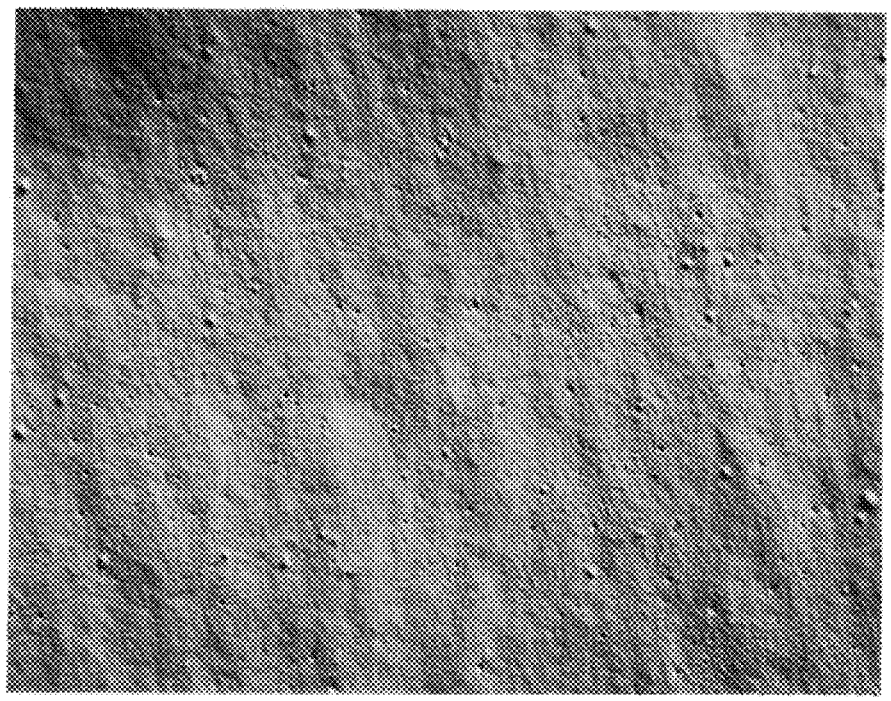
Figure 9:
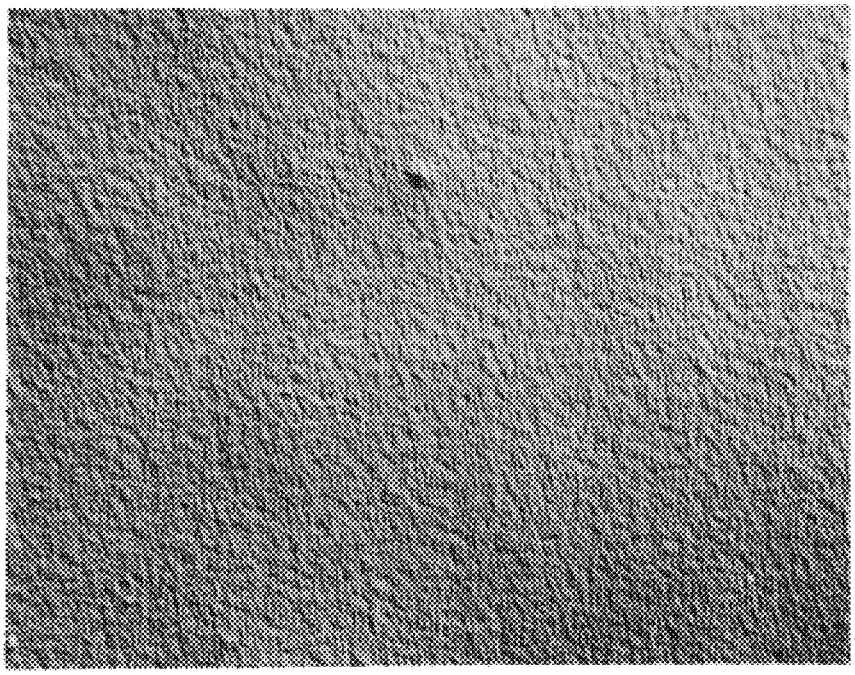
Figure 10:
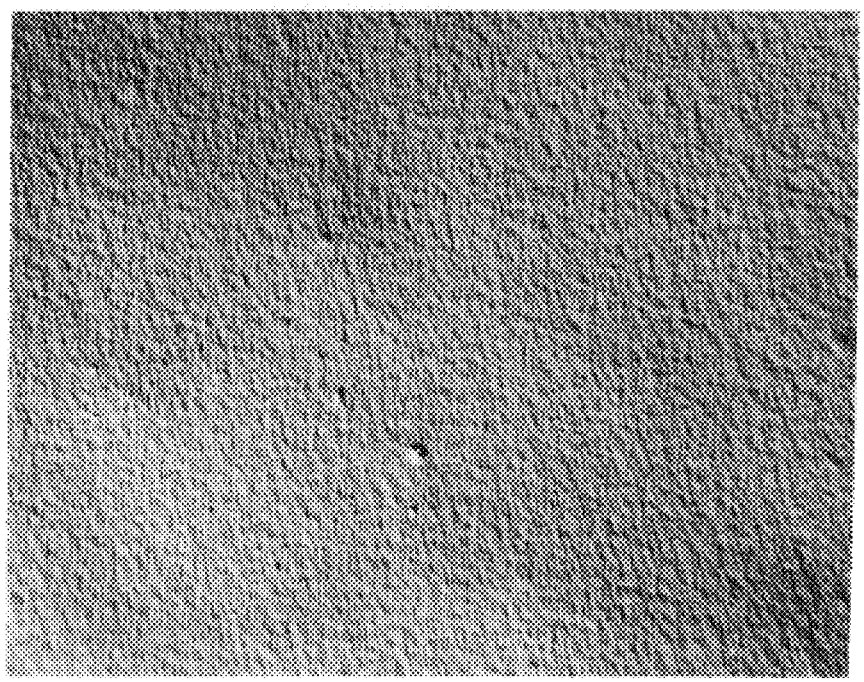

In this regard, the surfaces of Samples L, O and P, shown in FIGS. 1, 4, and 5, respectively, all have a uniform matte appearance—i.e., such surfaces are consistent and even. These are the samples having barrier coating receiving layers provided with hydrocarbon resin.

Figure 2:
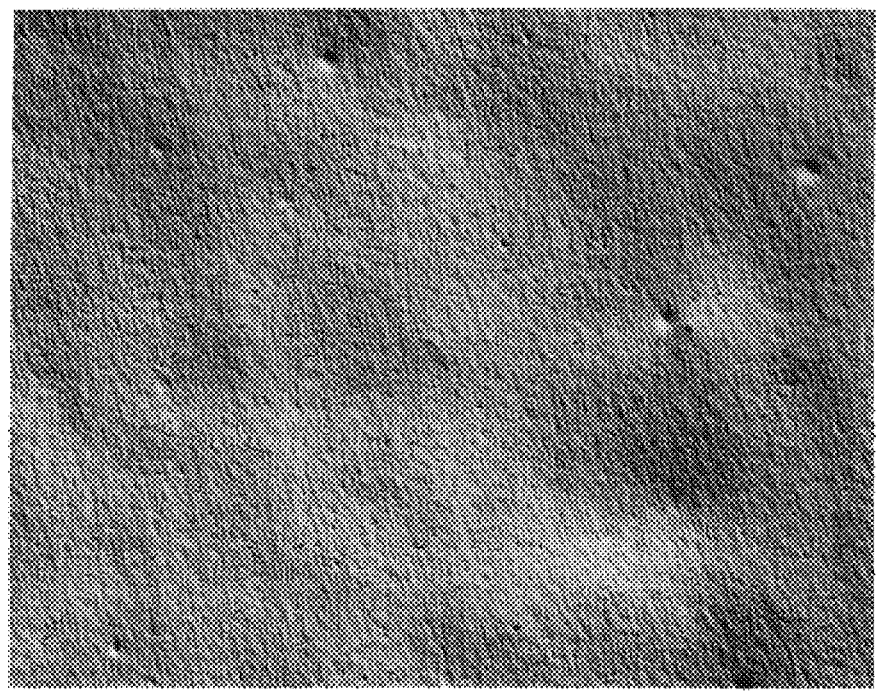
Figure 3:
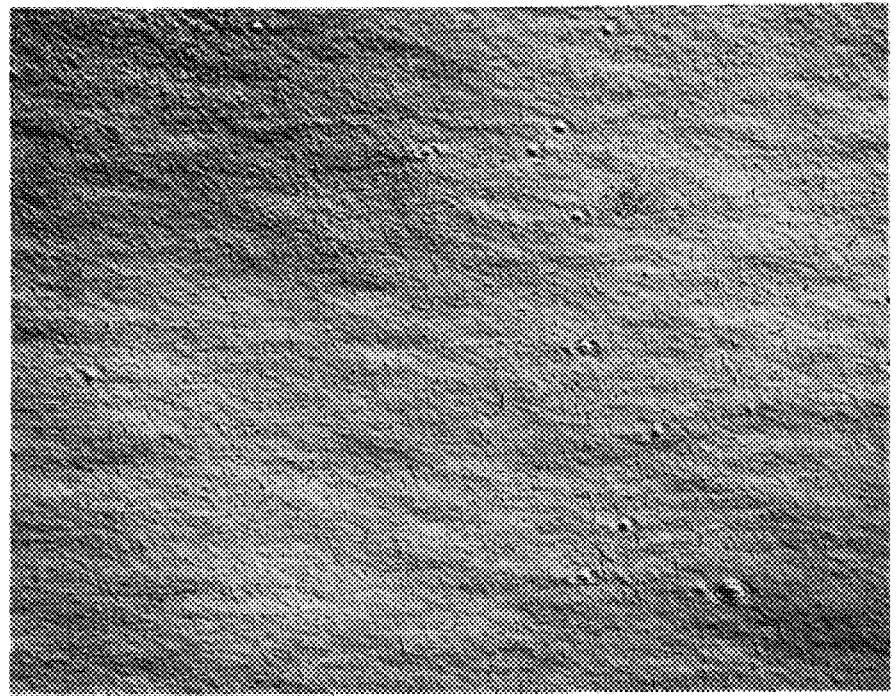

Contrasted with the foregoing are the results obtained from the samples lacking hydrocarbon resin in their barrier coating receiving layers. Specifically, as can be seen in FIG. 2, the surface of Sample M was dimpled, containing miniature pit marks. The Sample N surface was correspondingly uneven as evidenced by the intermixture of dark and light portions, shown in FIG. 3, and also pockmarked, as likewise depicted in this micrograph.

Metallization of Samples L–P was effected in the same manner as set forth in Examples 1–3. These metallized Samples were subjected to the same surface preparation, as discussed above, with micrographs likewise being generated, also at 100× magnification. The micrographs of the metallized Samples L–P are provided as FIGS. 6–10, respectively.

A comparison of FIGS. 6–10 indicates that the same surface characteristics, as shown in FIGS. 1–5, were likewise provided in the metallized surfaces. Accordingly, it is apparent that the surface characteristics of the films' barrier coating receiving layers are not affected by metallization.

According to the second technique, average RMS roughness and average $R_a$ were determined according to the procedure set forth herein for obtaining these values. Specifically, the topography of the samples' barrier coating receiving surfaces was measured with a TOPO3D Interferometer. This instrument was employed to profile a quantitative view of the surfaces, with generation of RMS roughness and $R_a$ values.

Measurements were taken at 100× magnification. Ten measurements were taken across the surface at different locations, employing a profile area of 51 microns by 51 microns, and a spatial sampling interval of 0.4 micron.

Average RMS roughness and average $R_a$ values and the associated standard deviations were calculated from the RMS and $R_a$ values thusly obtained. The results are tabulated in Table 5.

TABLE 5

| SAMPLE | AVG RMS ROUGHNESS (nm) | STD DEV | AVG $R_a$ (nm) | STD DEV |
|---|---|---|---|---|
| L | 14.183 | 0.878 | 11.332 | 0.795 |
| M | 11.078 | 1.409 | 8.757 | 1.211 |
| N | 13.903 | 1.501 | 10.926 | 1.247 |
| O | 14.929 | 0.886 | 11.916 | 0.705 |
| P | 14.707 | 0.690 | 11.748 | 0.582 |

With reference to the data provided in the above Table, lower average RMS roughness and average $R_a$ values of Sample M indicate a smoother barrier coating receiving surface than that of any of Samples L, N, O and P. However, as to these latter four Samples, what are significant are their standard deviation values. It is the combination of average RMS roughness and/or average $R_a$, with their respective standard deviation values, which exemplifies the difference between Samples L, O and P, on the one hand, and Sample N, and, for that matter, Sample M as well, on the other.

In this regard, Samples L, N, O and P did indeed all have a similar micro-roughness, as evidenced by their average RMS roughness and average $R_a$ values. However, the standard deviations obtained for Samples L, O, and P, the samples having hydrocarbon resin in their barrier coating receiving layers, were very different from those for Samples M and N, which lacked such resin in their barrier coating receiving layers.

Specifically, Samples L, O and P were all characterized by small standard deviation values. While the average RMS roughness and average $R_a$ values of these samples indicate roughness, their standard deviation values demonstrate that the roughness was uniform, or consistent. In contrast, the significantly larger standard deviations obtained for Samples M and N denote a nonuniform, or inconsistent, surface texture.

The two previously discussed measurement techniques demonstrated the roughness and consistency characterizing films with hydrocarbon resin included in their barrier coating receiving layers. This combination of roughness and consistency provides such films with excellent barrier coating receiving surfaces, and with application of the requisite barrier coating, produces excellent oxygen and moisture barriers.

EXAMPLE 6

A common problem in laminating metallized polyolefin films, particularly the polypropylene films, is a phenomenon called crazing, which is a microcracking of the metal in the transverse direction. One of the samples having hydrocarbon resin in its barrier coating receiving layer, specifically, Sample F, from Example 2, was evaluated for its resistance to crazing.

This sample was laminated to a 0.75 mil layer of Hercules T-523, from Hercules Incorporated, of Wilmington, Del., using Chevron 1017. A variety of laminating conditions known to promote crazing were employed, as set forth in Table 6.

TABLE 6

| LAMINATE SAMPLE | LINE SPEED | EXTRUSION TEMPS. | PE LBS/REAM | EXTRUSION NIP PRES. | CRAZED YES/NO |
| --- | --- | --- | --- | --- | --- |
| F-1 | 300 | STD. | 12.2 | 35 | NO |
| F-2 | 300 | STD. | 12.9 | 13 | NO |
| F-3 | 300 | STD. | 12.2 | 56 | NO |
| F-4 | 300 | STD. | 15.7 | 20 | NO |

As can be seen from the final column of Table 6, under different processing parameters, Sample F, as indicated, with its barrier coating receiving layer having the hydrocarbon resin, did not experience crazing. From the foregoing, it appears that, in the absence of components which would induce crazing, for instance, additives which interfere with metal adhesion, corresponding results would be expected generally, in polyolefin films having barrier coating layers thusly provided with hydrocarbon resin. It is accordingly evident that such films are craze resistant.

EXAMPLE 7

Flexing of metallized film cracks the metal surface, which results in poor oxygen barrier. Sample F, from Example 2 and a 0.75 mil film of Hercules MST-3—a commercially available tenter film were both subjected to 20 Gelbo Flexes. The effect of this flexing on oxygen barrier is shown in Table 7.

TABLE 7

| SAMPLE | OTR BEFORE FLEXING ($cm^3/m^2$/atm/day) | OTR AFTER FLEXING ($cm^3/m^2$/atm/day) |
| --- | --- | --- |
| F | 20.0 | 300.7 |
| MST-3 | 40.8 | 604.5 |

As is seen, flexing did deteriorate oxygen barrier in both films, but the deterioration was significantly less in Sample F. This result demonstrates that polyolefin films, with barrier coating receiving layers thusly provided with hydrocarbon resins, can also be more resistant to metal cracking than standard commercially available metallized film.

EXAMPLE 8

Samples E, F, and G from Example 2 were evaluated for metal adhesion. SCOTCH 3750 sealing tape was placed on the nonmetallized side of the Samples, to provide stiffness, and Scotch 800 tape was applied to the Samples' metallized surface, as the test tape.

The Samples were then placed in an Instron Universal Testing Machine, and the peel strength was measured. Mode of failure, on all of the Samples, was tape adhesion failure, with no metal lift evident. The resulting metal adhesion average peel strengths are provided in Table 8.

TABLE 8

| SAMPLE | METAL ADHESION (gm/cm width) |
| --- | --- |
| E | 227 |
| F | 291 |
| G | 209 |

The above values indicate that the Samples exhibited excellent metal adhesion. Such results demonstrate that polyolefin films with barrier coating receiving layers thusly provided with hydrocarbon resins are indeed characterized by superior metal adhesion.

EXAMPLE 9

As with Example 3, the trilayer films of Samples Q–T were prepared by the tenter process, also utilizing coextrusion from a trilayer extruder die head, as discussed therein, to provide films with a core layer having a barrier coating receiving layer on one side and a non-barrier coating receiving layer on the other. All the films had an overall thickness of 0.70 mil, with a 0.66 mil core layer, and each of the other two layers being 0.02 mil. thick.

For each of the Sample Q–T films, the core layer was a 97 percent xylene insoluble polypropylene homopolymer, obtained from HIMONT U.S.A., Inc., Wilmington, Del., and the non-barrier coating receiving layer was a blend of an olefinic terpolymer, together with 1000 ppm of an antiblocking agent. The terpolymer comprised approximately 1.5% by weight ethylene, 16.5% by weight butene-1 and 82% by weight propylene, and was obtained from Sumitomo Chemical Co. Ltd., of Japan.

In Samples Q and S. the antiblocking agent was Nikoloid, as previously indicated, an irregular zeolitic antiblock. In Samples R and T, Tospearl, which is a uniformly sized, crosslinked silicone rubber antiblock, was used.

As to the barrier coating receiving layers, Samples Q and R were provided with an olefinic ethylene–propylene copolymer having a hardness of R80 and obtained from Fina Oil and Chemical Company, Dallas Tex. For each of Samples S and T, the barrier coating receiving layer was a blend of homopolypropylene with 11% by weight of a hydrogenated hydrocarbon resin—specifically, a hydrogenated vinyl toluene–alpha methyl styrene copolymer, having a hardness of R110.

Abrasion of barrier coating receiving surfaces was effected by fixing the barrier coating receiving surface to a weighted sled, and dragging it across the non-barrier coating receiving surface, in a controlled manner. Each such abrasion was considered to be a cycle.

The films were metallized under identical conditions, in a common laboratory vacuum bell jar, with deposition of an aluminum coating on the barrier coating receiving layer. Testing for OTR was conducted, in the same manner as set forth in the previous Examples. The results of this testing are shown in Table 9.

TABLE 9

| SAMPLE | BARRIER COATING RECEIVING LAYER | ANTI-BLOCKING AGENT | NO. OF ABRASION CYCLES | OTR ($cm^3/m^2$/atm/day) |
| --- | --- | --- | --- | --- |
| P | Et-Pr copolymer | Nikoloid | 0 | 49.6 |
|   |   |   | 1 | 159.7 |
|   |   |   | 5 | 193.7 |
| Q | Et-Pr copolymer | Tospearl | 0 | 49.6 |
|   |   |   | 1 | 86.8 |
|   |   |   | 5 | 134.8 |
| R | PP/resin blend | Nikoloid | 0 | 23.2 |
|   |   |   | 1 | 52.7 |
|   |   |   | 5 | 100.7 |
| S | PP/resin blend | Tospearl | 0 | 23.2 |
|   |   |   | 1 | 41.8 |
|   |   |   | 5 | 41.8 |

For both Samples S and T, abrasion had less deleterious effect upon oxygen barrier in the subsequently metallized films than was experienced with Samples q and R. Further, this was the result whether non-barrier coating receiving surfaces with hard or soft antiblock.

The foregoing accordingly demonstrates that films with barrier coating receiving surfaces including hydrocarbon resin are characterized by increased resistance to damage.

EXAMPLE 10

Following the procedures described above for preparing films by the tubular process, a series of trilayer films was prepared in which the barrier coating receiving layers were a mixture of isotactic polypropylene and an ethylene–propylene copolymer containing several levels of hydrocarbon resin. The ethylene–propylene copolymer was either Fina Z, which contains about 6.5% ethylene, or Fina 8573, which contains about 4.5% ethylene. The hydrocarbon resin was Hercules Regalrez 1128.

These films were corona treated and metallized with a thin coating of aluminum as described above. The coated films were tested for their barrier properties against both oxygen and water vapor transmission. Results of this testing are recorded in Table 10.

TABLE 10

| SAMPLE | % HR | % PP | % COP | % $C^2$ IN COP | OTR ($cm^3/m^2$/atm\day) | WVTR ($gm/m^2$/day) |
| --- | --- | --- | --- | --- | --- | --- |
| U | 7 | 80 | 20 | 4.5 | 29.45 | .0465 |
| V | 11 | 80 | 20 | 4.5 | 40.92 | .05115 |
| W | 3.0 | 50 | 50 | 4.5 | 20.31 | 0.2015 |
| X | 5.5 | 50 | 50 | 4.5 | 26.97 | 0.2945 |
| Y | 7.0 | 50 | 50 | 4.5 | 29.92 | 0.263 |
| Z | 7.5 | 25 | 75 | 6.0 | 160.27 | 1.689 |
| Z-1 | 0 | 80 | 20 | 4.5 | 69.13 | 0.496 |

The improved barrier properties of the films in which the barrier coating receiving layer contained appropriate amounts of both the ethylene copolymer and hydrocarbon resin are immediately apparent.

Finally, although the invention has been described with reference to particular means, materials and embodiments, it should be noted that the invention is not limited to the particulars disclosed and extends to all equivalents within the scope of the claims.

What is claimed is:

1. A transparent multilayer polyolefin film comprised of an isotactic polypropylene core having, on at least one of its surfaces, a barrier coating receiving layer comprised of:
   a) polypropylene containing up to about 100% by weight based on the weight of the polypropylene of a copolymer of ethylene and propylene or an α-olefin; and
   b) up to about 30% by weight, based on the weight of a) of a hydrocarbon resin, said barrier coating receiving layer having a thickness about 1.25 to 43.5% the thickness of the core layer.

2. The film of claim 1 wherein the hydrocarbon resin comprises at least one member selected from the group consisting of resins prepared from terpene monomers, resins prepared from hydrocarbon monomers, resins prepared from monomers derived from $C_9$ petroleum fractions and dicyclopentadiene resins.

3. The film of claim 2, wherein the hydrocarbon resin comprises a hydrogenated hydrocarbon resin.

4. The film of claim 2, wherein the barrier coating receiving layer comprises about 1 to about 30 percent by weight of the hydrocarbon resin.

5. The film of claim 4, wherein the barrier coating receiving layer comprises about 3 to about 22 percent by weight of the hydrocarbon resin.

6. The film of claim 5, wherein the barrier coating receiving layer comprises about 5 to about 20 percent by weight of the hydrocarbon resin.

7. The film of claim 6, wherein the barrier coating receiving layer comprises about 7 to about 15 percent by weight of the hydrocarbon resin.

8. The film of claim 2, wherein the barrier coating receiving surface is an oxidatively treated surface.

9. The film of claim 8, further comprising a barrier coating adjacent the barrier coating receiving surface, and having a WVTR, of less than about 0.47 gm/m²/day, said barrier coating being selected from the group consisting of metals, silicon oxides, aluminum oxides and mixtures thereof.

10. The film of claim 9 wherein the barrier coating is aluminum.

11. The film of claim 10, having a WVTR of less than about 0.26 gm/m²/day.

12. The film of claim 11, having a WVTR of less than about 0.17 gm/m²/day.

13. The film of claim 10, further having an OTR of less than about 155 cm³/m²/atm/day.

14. The film of claim 13, having an OTR of less than about 77.5 cm³/m²/atm/day.

15. The film of claim 14, having an OTR of less than about 31 cm³/m²/atm/day.

16. The film of claim 15, having an OTR of less than about 15.5 cm³/m²/atm/day.

17. The film of claim 2, further comprising at least one additional functional layer situated on the side opposite from the barrier coating receiving layer said functional layer being selected from the group consisting of sealable layers, printable layers and slip layers.

18. A transparent film according to claim 1 wherein the barrier coating receiving surface has an average RMS roughness of at least about 12 nm., with a standard deviation of less than about 1.2.

19. The film of claim 18, the barrier coating receiving surface having an average RMS roughness of at least about 14 nm., with a standard deviation of less than about 1.2.

20. The film of claim 19, the barrier coating receiving surface having an average RMS roughness of at least about 14.2 nm., with a standard deviation of less than about 1.

21. The film of claim 18, further comprising a barrier coating adjacent the barrier coating receiving surface, and having a WVTR of less than about 0.47 gm/m²/day.

22. The film of claim 21, having a WVTR of less than about 0.26 gm/m²/day.

23. The film of claim 22, having a WVTR of less than about 0.17 gm/m²/day.

24. The film of claim 21, further having an OTR of less than about 155 cm³/m²/atm/day.

25. The film of claim 24, having an OTR of less than about 77.5 cm³/m²/atm/day.

26. The film of claim 25, having an OTR of less than about 31 cm³/m²/atm/day.

27. The film of claim 26, having an OTR of less than about 15.5 cm³/m²/atm/day.

28. The film of claim 9 further comprising at least one additional functional layer situated on the side opposite from the barrier coating receiving layer, said functional layer being selected from the group consisting of sealable layers, printable layers and slip layers.

* * * * *